(12) United States Patent
Nandy et al.

(10) Patent No.: US 8,027,983 B1
(45) Date of Patent: Sep. 27, 2011

(54) ENHANCED QUERY PERFORMANCE USING FIXED LENGTH HASHING OF MULTIDIMENSIONAL DATA

(75) Inventors: Sagnik Nandy, Mountain View, CA (US); Jonathon A. Vance, San Jose, CA (US); Jan Matthias Ruhl, Mountain View, CA (US)

(73) Assignee: Google Inc., Mountain View, CA (US)

( * ) Notice: Subject to any disclaimer, the term of this patent is extended or adjusted under 35 U.S.C. 154(b) by 747 days.

(21) Appl. No.: 11/733,713

(22) Filed: Apr. 10, 2007

(51) Int. Cl.
*G06F 7/00* (2006.01)
*G06F 17/30* (2006.01)

(52) U.S. Cl. .................... 707/747; 707/769; 707/803

(58) Field of Classification Search .................. 707/1–3, 707/100–102, 747, 769, 803, 802, 790, 758, 707/741, 736, 705, 999.001, 999.002, 999.003, 707/999.1, 999.101, 999.102
See application file for complete search history.

(56) References Cited

U.S. PATENT DOCUMENTS

| | | | |
|---|---|---|---|
| 6,169,990 B1 * | 1/2001 | McGregor et al. | 707/101 |
| 6,212,184 B1 * | 4/2001 | Venkatachary et al. | 370/392 |
| 6,360,215 B1 * | 3/2002 | Judd et al. | 707/3 |
| 7,136,861 B1 * | 11/2006 | Sinclair et al. | 707/101 |
| 2005/0038784 A1 * | 2/2005 | Zait et al. | 707/5 |
| 2005/0192941 A1 * | 9/2005 | Biedenstein et al. | 707/3 |
| 2006/0095521 A1 * | 5/2006 | Patinkin | 709/206 |
| 2008/0189250 A1 * | 8/2008 | Cha et al. | 707/3 |

OTHER PUBLICATIONS

Wikipedia.org, "First Normal Form" Mar. 16, 2007, Wikipedia.org <http://en.wikipedia.org/w/index.php?title=First_normal_form &oldid=115566422>, p. 1-4.*
Fuller, Arthur, "Intelligent Database Design Using Hash Keys" Feb. 17, 2006, www.simple-talk.com <http://www.simple-talk.com/content/print.aspx?article=219>, p. 1-3.*
Noe, "Binary numeral system", Apr. 7, 2006, Wikipedia.org, p. 1-12.*
Wikipedia, "Hash function", Apr. 5, 2010, Wikipedia.org, p. 1-11.*

* cited by examiner

*Primary Examiner* — Brent Stace
(74) *Attorney, Agent, or Firm* — Fish & Richardson P.C.

(57) ABSTRACT

Methods, systems and apparatus, including computer program products, for enhancing query performance through fixed length hashing of multidimensional data. According to one method, a fixed length hash of a multidimensional data record is created where the hash has respective fixed length sections for each data dimension of the record being hashed. The composite fixed length hash is stored with a reference to the original data record to which it corresponds. Query parameters are hashed and compared to a corresponding section of the fixed length hash to determine a set of candidate records.

19 Claims, 8 Drawing Sheets

ENHANCED QUERY PERFORMANCE USING FIXED LENGTH HASHING OF MULTIDIMENSIONAL DATA

BACKGROUND

The present disclosure relates to data storage and retrieval.

Modern databases can store and provide retrieval mechanisms for data ranging from simple text to more complex binary data such as graphics, sounds, and video. Retrieval response time for information matching a set of query parameters can range from a few milliseconds or less for simple queries of a small number of records to a few seconds or more for complex queries involving a large number of records having multiple fields.

One or more databases can work behind the scenes in a web-based application where a web interface provides user access to the information stored in the database using, for example, an Internet browser. A fast query response time is a desirable trait for most applications incorporating a database, and is especially desirable for web-based applications. A fast response time can increase user productivity and promote return visits through a satisfactory user experience. Enhanced query response times can also help avoid long wait times that might cause a user to repeatedly reissue a query, hit a browser's refresh button, or leave the interface site entirely.

An Internet traffic analysis application is an example of a web-based application where enhanced query response times for the underlying database information positively impacts the user experience. Such an application, for example, Google Analytics, which is available from Google, Inc., in Mountain View, Calif., can be a useful analytical tool for web publishers in optimizing web site layout, appearance, and interfaces. Delays in returning requested information can cause the user experience, as well as the usefulness of the application to suffer.

In this context, a web publisher is an entity, such as person or an enterprise, that hosts web pages or web sites that can be accessed over a network, such as the Internet. The publisher can monitor analytical data related to user visits and links to the publisher web pages or web sites. Example analytical data includes data related to domains and/or web sites from which visitors arrived and to which the visitors departed; traffic patterns, e.g., navigation clicks, of visitors within the publisher's web site; visitor actions, e.g., purchases, filling out of forms, etc. and other actions that a visitor may take in relation to the publisher's web site.

The analysis of such analytical data can, for example, inform the publisher of how visitors found the publisher's web site and how the visitors interacted with the publisher's web site. With this understanding, the publisher can implement changes to increase revenue generation and/or improve the visitor experience. For example, a publisher can focus marketing resources on advertising campaigns, and/or identify web site bottlenecks that impede the visitor experience, and/or identify other publishers as potential partners for cross-linking, etc.

The data collected for such detailed analysis can have many dimensions. Queries of this data requesting correlated output satisfying one or more query parameters can require searching a large number of entries for a relatively small number of matches. Reducing the query response time for such searches is desirable.

SUMMARY

This specification describes technologies relating to enhancing query performance using data hashes to represent a set of data records where the data hashes have a fixed length.

In general, one aspect of the subject matter described in this specification can be embodied in methods that include the actions of creating a fixed length data hash of a data record using a hashing algorithm, the data record having multiple dimensions, and the data hash comprising respective sections for each of the dimensions of the data record. Each of the sections can include a hash representing a value stored in the corresponding dimension of the data record.

One aspect of the subject matter described in this specification can be embodied in methods that include the actions of counting a number of values that appear in a list of values in a field of a data record and storing a wildcard hash value in a section of a fixed length data hash representing the data record if the number of list values exceeds a maximum.

Particular embodiments of the subject matter described in this specification can be implemented to realize one or more of the following advantages. The invention can provide enhanced query performance in a system including a user interface device and one or more computers operable to interact with the user interface device and receive and process queries from the user interface device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
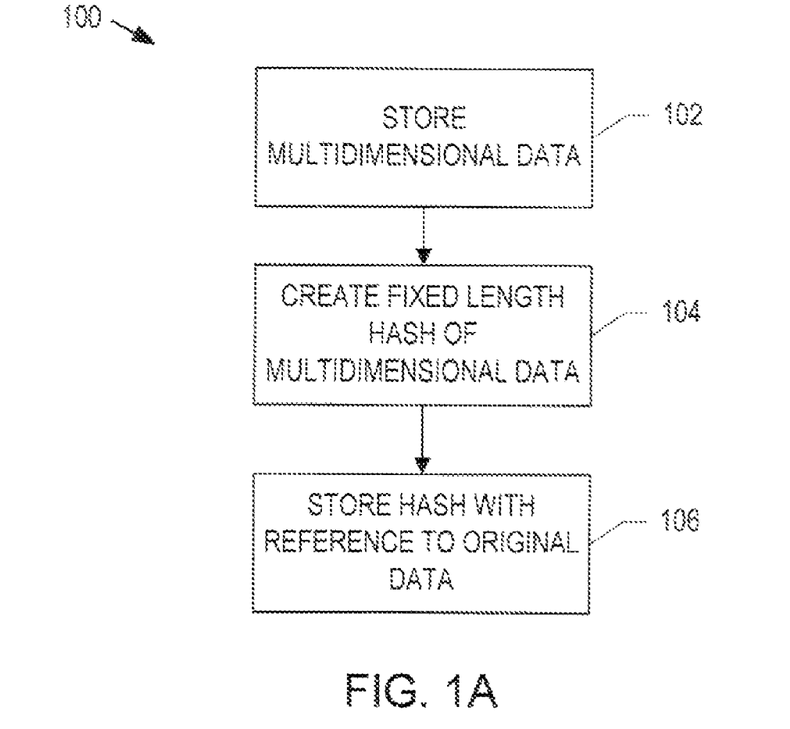
FIG. 1A is a flow chart of an example process for creating a fixed length hash of a multidimensional record.

FIG. 1A is a flow chart of an example process for creating a fixed length hash of a multidimensional data record. A multidimensional data record is made up of a number of dimensions with corresponding values. Multidimensional data records will generally be described herein as database records, where dimensions are the fields of the record and values are the data stored in the fields. Multidimensional data can, however, be stored in other formats without departing from the teachings of this disclosure, such as an array of variables or a delimited file.

The process (100) stores multidimensional data (102). The process proceeds to create a fixed length hash of the multidimensional data (104) and store the hash with a reference to the original record (106). Generally, one data record (database row) will have one corresponding fixed length hash.

Figure 1B:
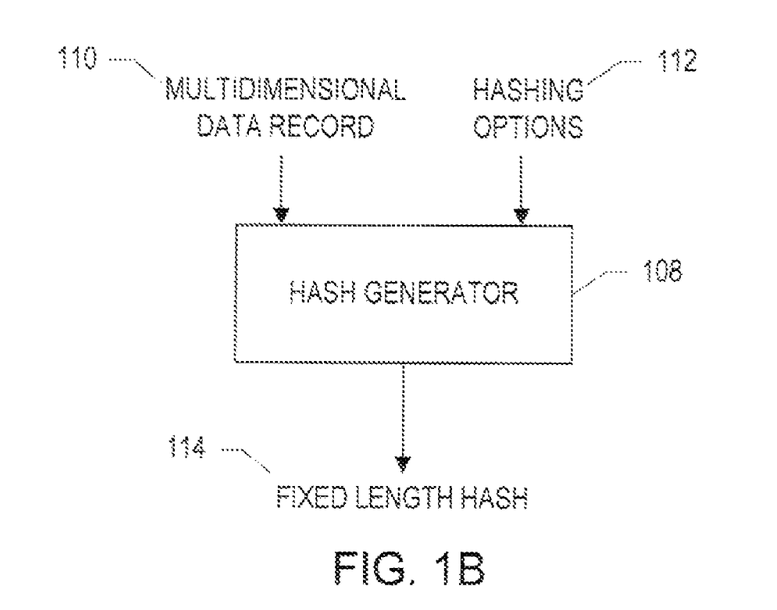
FIG. 1B is a block diagram of an example hash generator.

FIG. 1B is a block diagram of an example hash generator. The hash generator 108 can receive a data record 110 having multiple dimensions as well as a set of hashing options 112. The hash generator 108 can output a fixed length hash 114 corresponding to the data record 110 that has been hashed according to the hashing options 112.

For example, a data record having five dimensions (fields) with respective values V1, V2, V3, V4, and V5 can be supplied to the hash generator 108, along with hash options that indicate, for example, the desired length of the hash for each of the fields. The data record values and the hash options can be supplied in any known manner of passing values between computer implemented methods. For example, the hash options can be supplied to the hash generator 108 as a string of comma delimited whole numbers such as "2, 8, 16, 4, 1" where the first number corresponds to the desired length of the hash of the first field, the second number corresponds to the length of the hash of the second field, and so forth. Alternatively, the values and hash options can be supplied together such as in the string "'V1', 2, 'V2', 8, 'V3', 16, 'V4', 4, 'V5', 1". The hash generator 108 applies a hashing algorithm to the supplied value to create a hash of the value having the length indicated by the hashing options for the given field.

Length as used herein is considered to be a number of bits to assign to the hash. In practice, the length can instead refer to bytes, kilobytes, or any measurement of hash length. The length assigned to a given dimension of data can be based on how many different values the data can take, or often takes, across the entire set of data records and how often query requests are received directed toward the given dimension. For example, if the given dimension can only take on one of two values then a hash length of one bit is sufficient. If the dimension can take on a number of values then more bits may be needed to avoid hash collisions. However, if query parameters are rarely received for the given dimension then a lesser number of bits can be used to reduce the hash size.

Figure 2A:
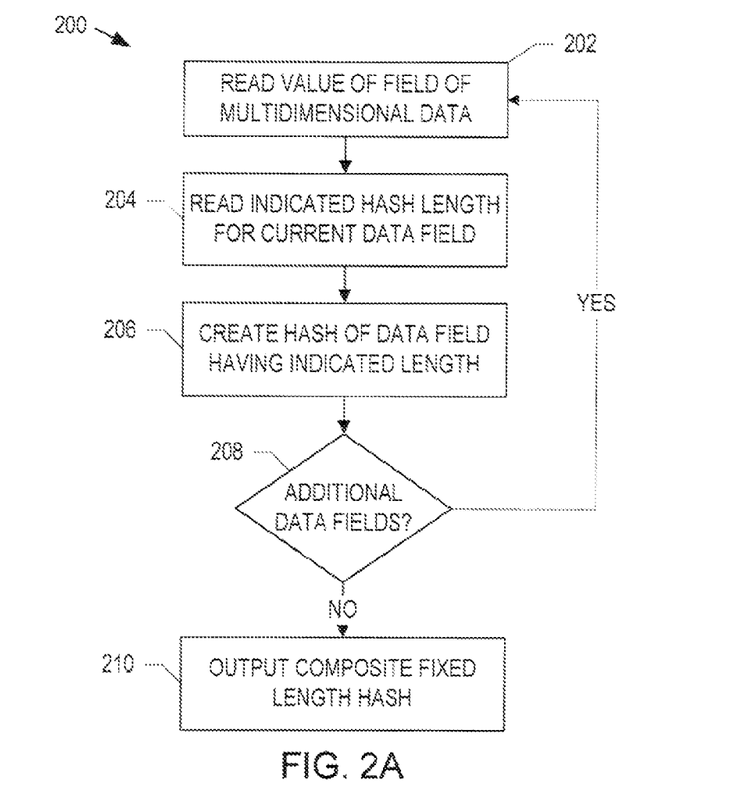
FIG. 2A is flowchart of an example process for creating the fixed length hash.

FIG. 2A is flowchart of an example process (200) for creating the fixed length hash. A field of the multidimensional data record is read to retrieve its value (202) as well as the indicated hash length for the current field (204). The data value and the indicated hash length are used to create a hash of the value having the indicated length (206). If there are additional fields to be processed (208) the method returns to read the next field value. If there are no more fields to be processed (208) the method returns a composite fixed length hash.
corresponding to the field values of the processed record (210). Example hashing algorithms that can be used with the disclosed method include, but are not limited to, MD5 (Message-Digest algorithm 5) and SHA-1 (Secure Flash Algorithm 1).

Figure 2B:
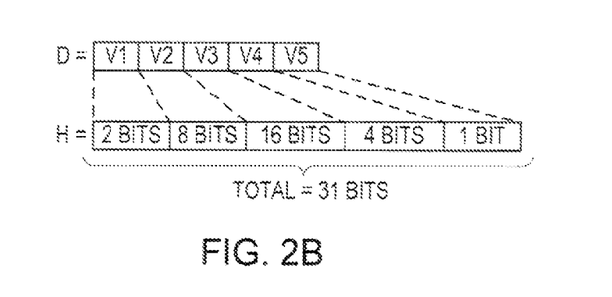
FIG. 2B shows an example mapping relationship between a data record and its resulting fixed length hash.

FIG. 2B shows a mapping relationship between a data record D and its resulting fixed length hash H created using the hash length options listed above. Only five fields with five values are shown for simplicity. The present disclosure can be applied to data records having many more or fewer fields. The composite hash (H) has a hash section corresponding to value 1 (V1). The length of V1's hash section is 2 bits. Value 2 has a corresponding hash section length of 8 bits. Value 3 has a corresponding hash section length of 16 bits. Value 4 has a corresponding hash section length of 4 bits, and value 5 has a corresponding hash section length of 1 bit. The total length of the composite fixed length hash H is 31 bits.

The composite fixed length hash H includes hashes for each of the processed values and is potentially much smaller than the data it represents. Because of its smaller size, hash H can be stored in higher level computer memory, for example, transistor based RAM, a resource which is more limited than slower magnetic disk storage. A computer processor can generally access and perform operations using this higher level memory faster than it can with magnetic disk storage.

An entire set of data can be hashed in this manner where each composite hash is stored along with a reference to the original data record to which the hash corresponds. The hashes can be searched to find records which satisfy a set of query parameters, or to reduce the set of records which possibly satisfy those parameters where the original data records can then be analyzed to further refine the results.

Querying Data Records Based on the Hashes

Figure 3A:
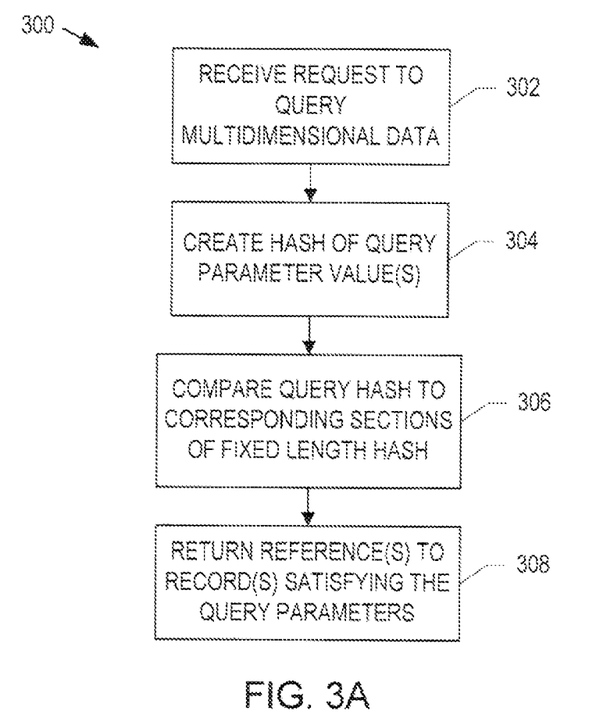
FIG. 3A is flowchart of an example process for querying the multidimensional data based on the fixed length hash.

FIG. 3A is flowchart of an example process (300) according to an implementation of the present disclosure for querying the multidimensional data based on the fixed length hash. The process receives a request to query the multidimensional data (302). The method proceeds to create a hash for one or more query parameter values (304) (the resulting hashes are referred to herein as query hashes). A query hash is created for each respective query parameter value. A query parameter value can be, for example, a value of a field where records having that value in the indicated field are desired. Query parameters values can be received via a user interface, such as a web interface. For example, a set of dialog boxes or dropdown menus corresponding to fields of stored data records can be displayed on a user interface where a user can type values into the fields or select values from dropdown boxes. The more general term, query parameters, can include not only the query parameter values, but additional parameters such as Boolean operators that are part of the query.

In creating the query hash, the same hashing algorithm and indicated length should be used as were used to create the data hash section corresponding to the query parameter field. The one or more query hashes are then compared to the sections of the composite fixed length hash to which they correspond (306), and where one or more matches (or non-matches if the query parameters include a NOT operator) are found in the data hash sections, references to the records they represent are returned (308). The query parameters are not limited to searching for all records that affirmatively have values in designated fields, searches for records that do not have the supplied values are possible as are nested Boolean queries. For example, an implementation can use serial searches to continually narrow the list of data records satisfying the query parameters by performing a series of searches on the fixed length hash or, for example, expand the list of data records if the query includes a parameter that is subject to a logical OR.

Figure 3B:
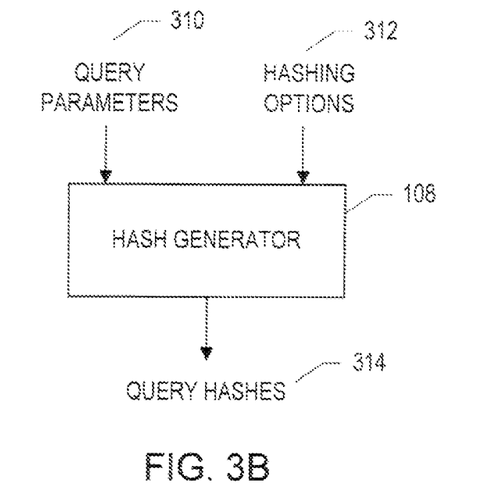
FIG. 3B is a block diagram of an example hash generator.

FIG. 3B is a block diagram of an example hash generator 108 that can be used to generate the fixed length hashes described above. The hash generator 108 can receive query parameters 310 and hashing options 312. The hash generator 108 can output a query hash 314 for each query parameter value.

In an implementation, the query parameters 310 include values for one or more fields, and an indication, for each value, as to which field the value corresponds. The hashing options include, for each value, the length of the query hash to be created for the value. As stated above, for proper operation, the same hashing algorithm and hash length should be used to hash the query parameter values as were used to hash the data field to which they correspond. According to an implementation, the hash generator 108 can be configured to use various selectable hashing algorithms such that sections of the composite fixed length hash can be created using different hashing algorithms as selected by hashing options 312. In such an implementation, the hashing options 312 should indicate which algorithm should be used for each query parameter value and this selection should match that used to create the data hash of the field corresponding to the query parameter value.

For example, a query of a set of data records for web server hits can request all hits from computers using Microsoft Internet Explorer as the internet browser where the hits originated from Japan. (Assume, for this example, that type of browser is stored in field two and country of origin is stored in field four.) The query parameter values are "Microsoft Internet Explorer" and "Japan". The hashing parameters include information that indicates to the hash generator 108 that the query hash of "Microsoft Internet Explorer" should be 8 bits long (because it corresponds to field two) and that the query hash of "Japan" should be 4 bits long (because it corresponds to field four). In an implementation, the hashing options can be gathered, for example, from a user query interface (to obtain the fields to which the query parameter values correspond) and from hashing option information stored during the data record hashing process (to obtain the desired query hash lengths).

Figure 4:
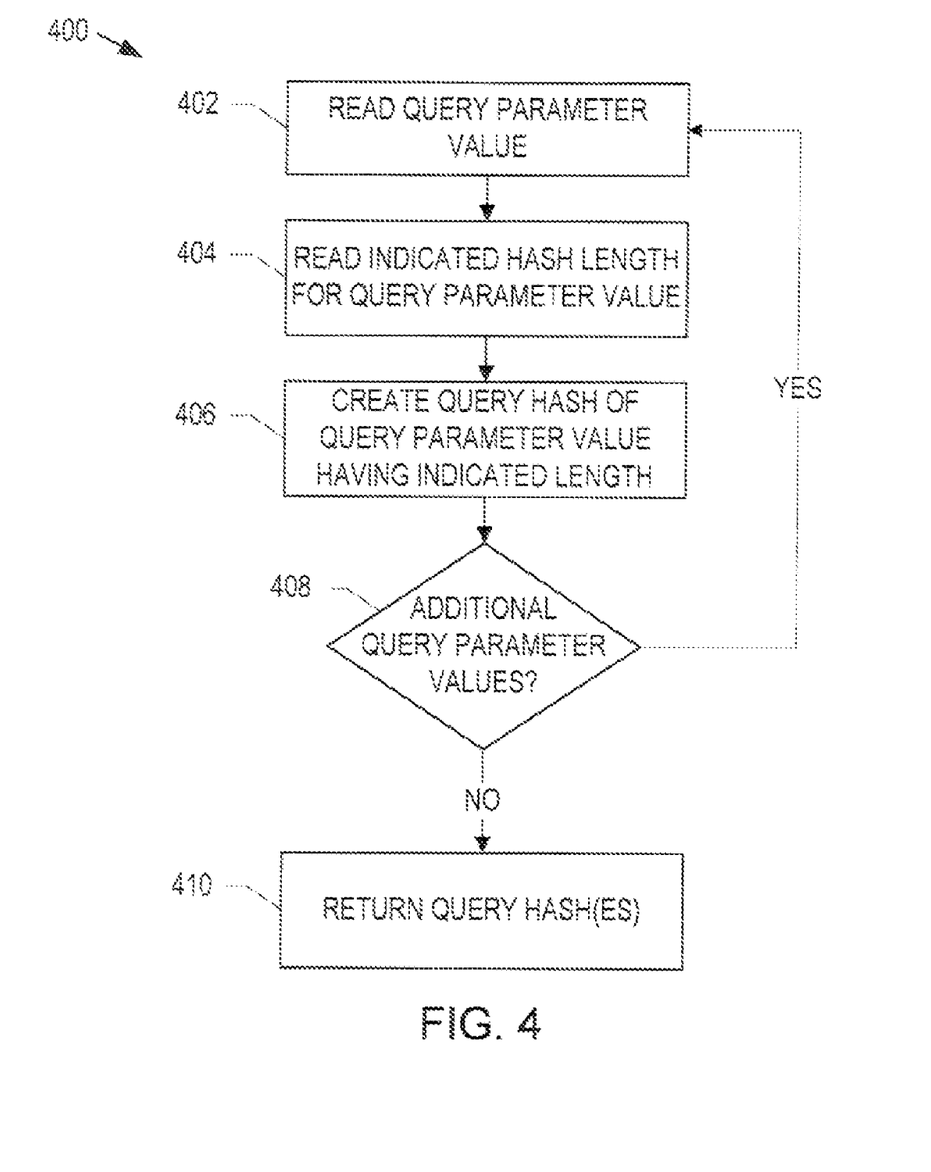
FIG. 4 is flowchart of an example process for creating query hashes.

FIG. 4 is flowchart of an example process (400) for creating query hashes. A query parameter value is identified (402) as well as the indicated hash length for the query parameter value (404). A query hash is created for the query parameter value (406). If additional query parameter values are present, the process loops to repeat these steps for the next query parameter value (408), and if there are no additional query parameter values, the process returns the created query hashes (410).

Figure 5A:
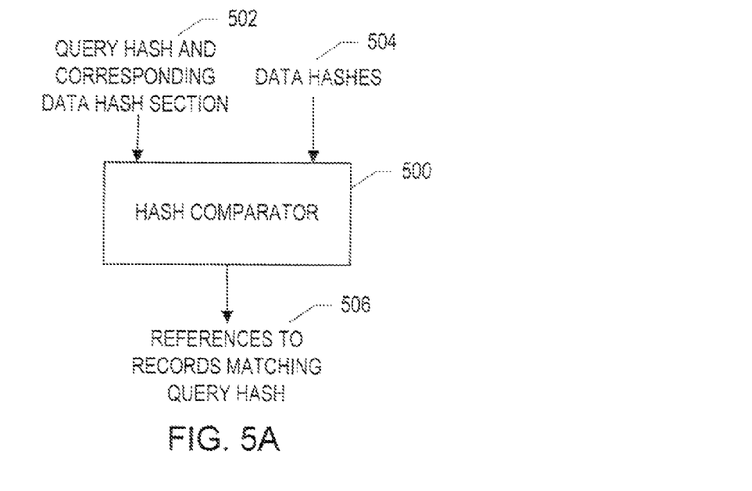
FIG. 5A is a block diagram of an example hash comparator.

FIG. 5A is a block diagram of an example hash comparator 500. The hash comparator 500 can receive a query hash and corresponding data hash section information 502 and data hashes 504. The hash comparator 500 can output references to records matching the query hash 506. Negative comparator operations can be performed as well, where the comparator returns references to all records that have hash sections that do not match the query hash. Compound comparator operations can be performed where references are returned that have hash sections that match multiple query hashes in their respective fields. The corresponding data hash information for the query hash indicates the section of the data hash that should be compared to the query hash. This information can take the form of a beginning and ending index number of the bits of the data hash. Alternatively, only the beginning index number is supplied and the comparator can determine at which index number to stop the comparison based on the length of the query hash.

Figure 5B:
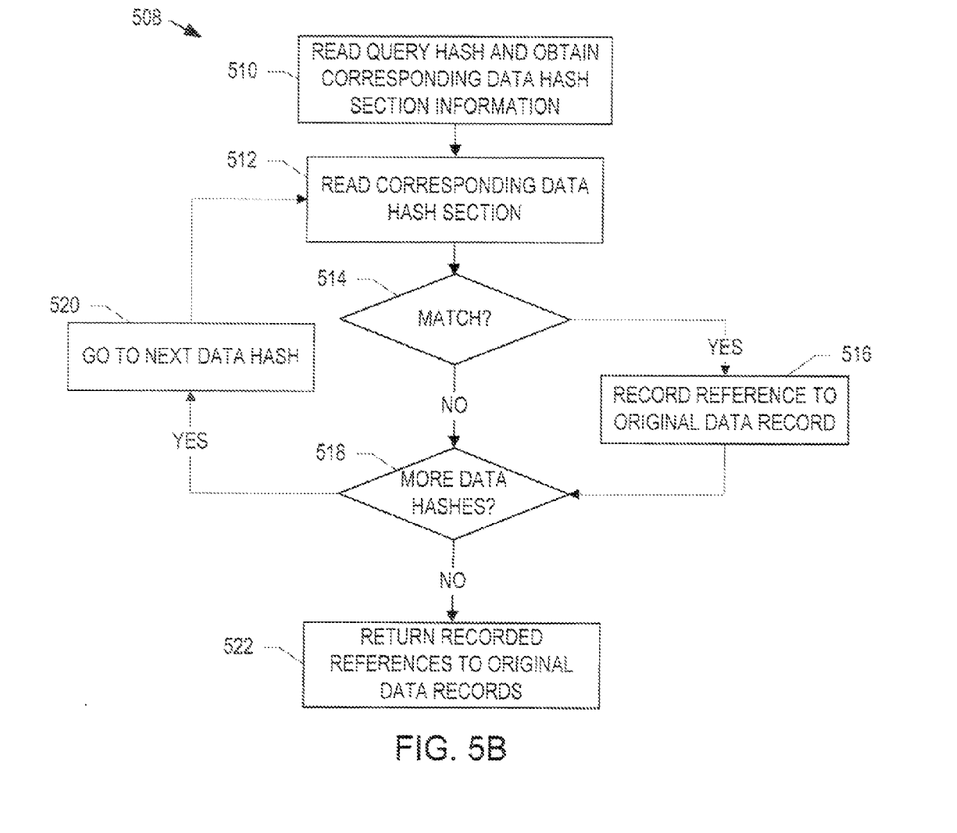
FIG. 5B is flowchart of an example process for comparing query hashes and data hashes.

FIG. 5B is flowchart of an example process (508) for comparing query hashes and data hashes. A query hash and its corresponding data hash section information are identified (510). The data hash section indicated by the data hash section information is identified (512) and the two hashes are compared (514). If there is a match, the reference to the original data record that is stored or indicated by the data hash is recorded (516). If there are more data hashes to process (518) the method identifies the next data hash (520) and locates its corresponding data hash section. In one implementation, once all of the data hashes have been compared to the query hash, the recorded references to the original data are returned (522).

Figure 6:
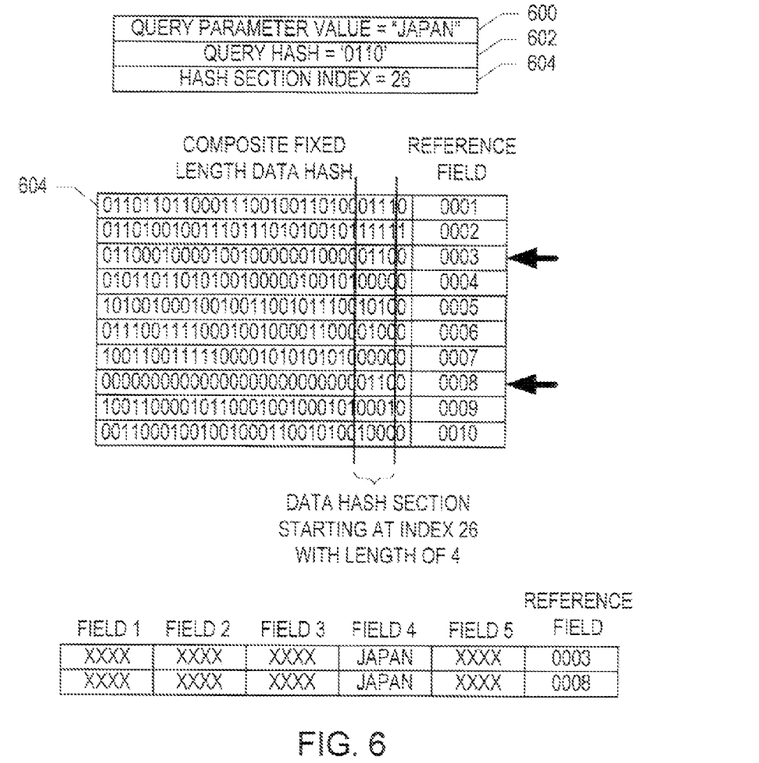
FIG. 6 shows a representative comparison of a query hash to a number of data hashes.

FIG. 6 shows a representative comparison of a query hash to a number of data hashes. Query parameter value "Japan" 600 has been hashed to create the 4 bit hash '0110' 602. The hash section index '26' 604 indicates that the comparison should begin with data hash hit having index 26 (this is the 27th bit as the index of the first bit is zero). Because the query hash has 4 hits, the comparison will start with the bit at position 26 and continue until four bits have been compared (index numbers/bit positions 26-29). A table of ten composite fixed length data hashes is shown along with references to the original data represented by the hashes. The four bits between the two heavy vertical lines are bit positions 26, 27, 28, and 29. It is these hits that correspond to field 4. The query hash '0110' matches the data hashes having references '0003' and '0008'. The original records corresponding to these references have field 4 values of "Japan". In eases where a hash collision occurs, however, the queried field might not contain the expected data. The disclosed method reduces the number of data records to a candidate subset. The field values of this subset can be examined directly to determine if a true match exists. As mentioned above, compound queries can be performed using serial comparisons (first narrowing to a subset of candidate records and then narrowing again any number of times based on a query hash of one or more additional fields) or by parallel comparisons (comparing a first query hash to its corresponding data hash section followed by additional comparisons if the previously compared hashes match).

Segmenting Fixed Length Data Flash Sections for Fields Storing Lists

Some database records include fields that store more than one value in a delimited list. For example, a single database field can store 'value1, value2, value3, ... valueN' in a comma delimited list. If a hash section is created in a composite fixed length hash for the entire comma delimited list, then a hash based query of the field will return matches if the entire list is used as the query parameter value. However, in this case a hash based query would not return a match if a query parameter value appears as one of the many values in the list. It is often desirable, though, to search for records that have a query parameter value that appears in the field's delimited list of values. The fixed length data hash section of data fields with lists of values can be segmented to facilitate such queries. Each value in the list can be assigned a segment of the fixed length data hash section. The values in the list can be hashed individually and placed into their respective segment of the composite data hash section.

Figure 7:
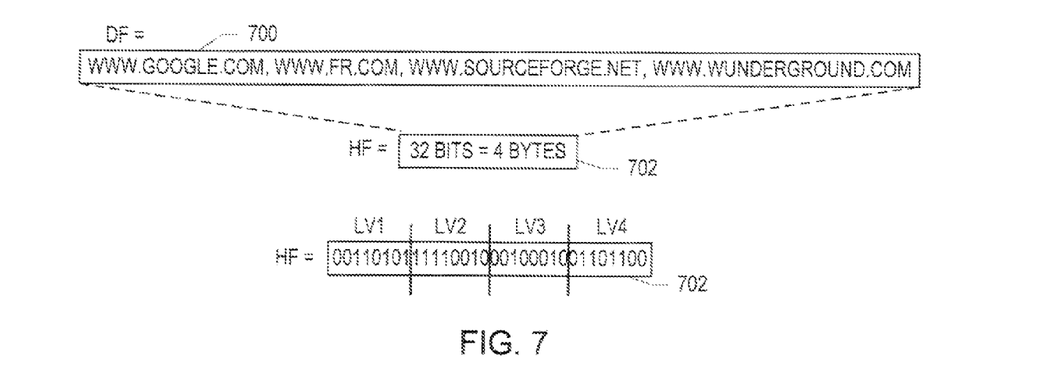
FIG. 7 shows a mapping relationship between a data record field including a list of URLs and its segmented fixed length hash section.

FIG. 7 shows an example mapping relationship between a data record field including a list of four URLs and its segmented fixed length hash section. Data field (DF) 700 includes a comma delimited list of URLs: www.google.com, www.fr.com, www.sourceforge.net, and www.wunderground.com. The data field has a fixed length hash section 1-IF 702 that is 32 bits in length (4 bytes). The first byte segment of the hash section is allocated to the first URL in the list, the second byte to the second URL, the third byte to the third URL, and the fourth byte to the fourth URL. A single URL query parameter value can be hashed and compared to each of the segments of the hash section to find records that include that URL.

Figure 8:
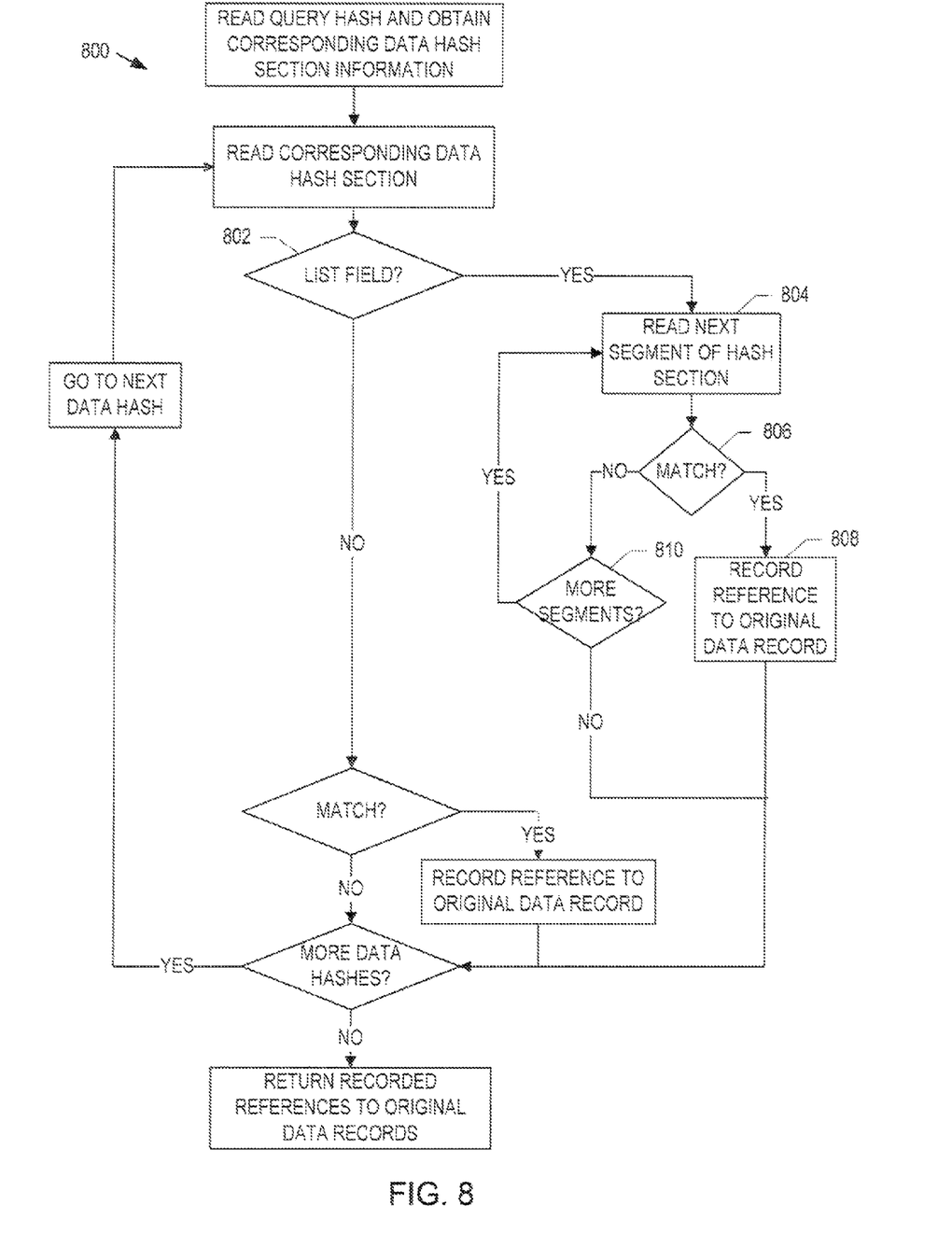
FIG. 8 is flowchart of an example process for comparing query hashes and data hashes where some data fields include lists of values.

FIG. 8 is flowchart of an example process 800 for comparing query hashes and data hashes where some of the data fields include lists of values. Before a comparison is made, a check is performed to determine if the current data hash section corresponds to a field that stores lists of values (802).

If the corresponding field is a list field, the process continues to read a segment of the hash section (804). If the query hash matches the segment of the hash section (806) a reference to the original data record is recorded (808). If the query hash does not match the current segment of the data hash section (806), processing continues to the next segment (810) if more exist, or the process otherwise continues on to the next data hash.

Segmenting the fixed length hash section of fields having lists of data in this manner is sufficient where the number of values in the list is fixed. In some cases, however, the number of values that a field can hold is open ended, where the list can include no values or any number of values. If the problem is addressed by allocating enough space in the composite fixed length hash to the field so as to accommodate the worst case scenario (largest number of values in the list as possible), the compactness of the fixed length hash is sacrificed for a scenario that may seldom occur. The problem can not be addressed by allocating additional space in a composite fixed length hash on a per occurrence basis because these hashes would no longer have a fixed length. Hash sections within the composite hash would be shifted causing incorrect query operation.

A wildcard hash value can be used to solve the above described problem. Through analysis of the subject data, a maximum number of list values for hashing can be selected. Any list values up to and including this number are hashed and stored in respective segments of the fixed length data hash section corresponding to the list field. If the list includes more values than the maximum, then the wildcard value is stored in the hash section. The wildcard value can be a hash value that is reserved to indicate that the maximum number of list values has been exceeded. The wildcard hash can be a value that the hashing algorithm does not use. That is, the hashing algorithm is unable to create hashes (or seldom creates hashes) that match the wildcard value. Where the wildcard value is detected during a comparison of query hashes and data hashes, a reference to the corresponding data record can be recorded so that the original data can be examined further to determine if the longer list includes the query value being sought.

Consider an implementation of the present disclosure where a URL field includes a list of URLs visited by an Internet user during a login session. The user could visit one URL, dozens of URLs, or more. For this implementation, the maximum number of list values is set to four. Therefore, for the URL list shown in FIG. 7, the values will be hashed and placed into their respective hash section segments. However, if the field were to includes five or more URLs, the hash generator would place the wildcard value into the hash section. Assuming that the wildcard value is '0000' (hexadecimal), the hash generator will place zeros in each of the 32 bit positions.

Figure 9:
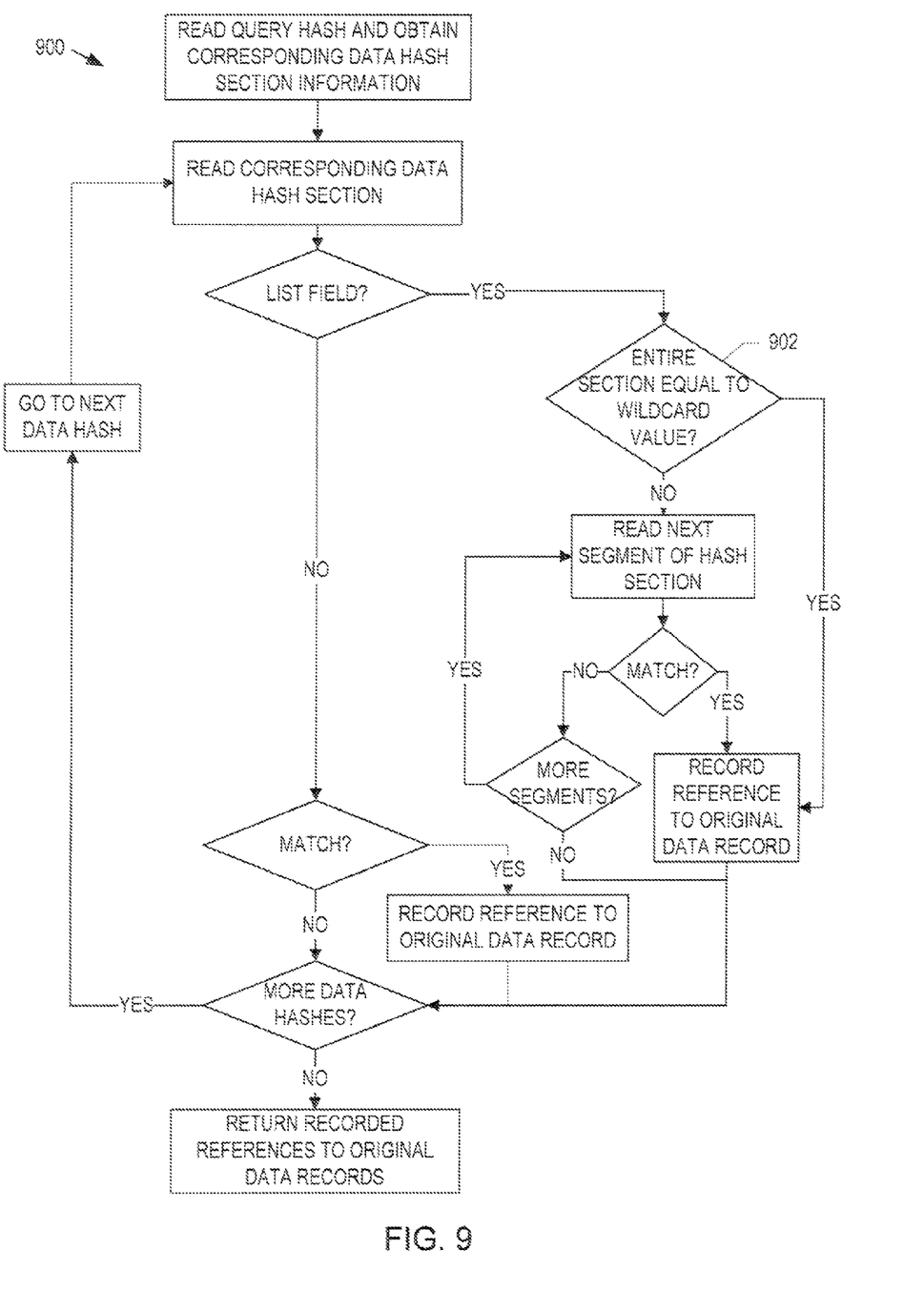
FIG. 9 is flowchart of an example process for comparing query hashes and data hashes where a wildcard hash value is used.

FIG. 9 is flowchart of an example process 900 for comparing query hashes and data hashes where a wildcard hash value is used. Where a hash section corresponding to a list field is encountered, the complete section is read to determine if it is equal to the wildcard hash value (902). If the section is equal to the wildcard hash value, then a reference is recorded to the original data record. If the wildcard hash value is not found, the process continues to read the segments of the hash section.

Use in a Web Analytics Suite

In an implementation, the disclosed methods and structures are used in a web-based Internet traffic analytical suite. In this application, many dimensions of data corresponding to characteristics of web site traffic are collected. In one implementation, data records include more than forty dimensions. Querying a large number of records across more than forty dimensions can lead to longer than desired query response times. Implementing the disclosed method in this application can reduce query response times as much as, for example, sixty to eighty percent.

The wildcard hash value can be used in this implementation for fields that store the web addresses (URLs) visited by a user during a login session. If the user only visits one URL then the data field storing the URL merely includes a single URL. However, if the user visits seven URLs during a session, the data field includes all seven URLs. If most login sessions only list four or less URLs, the maximum number of list values to be hashed for this field can be set to four. In that case, all sessions that include four or less visited URLs can have their URLs hashed and placed in their respective segments of the field's representative section in the fixed length data hash. If five or more URLs are visited, however, a wildcard value is placed in the field's representative section of the composite fixed length data hash. Assuming that one byte of the fixed length hash is reserved thr hashes of the URL field, the wildcard value can be, for example, '0000' (hexadecimal) to indicate that more than four URLs were present in the data record represented by the composite fixed length hash.

Where a query for all records having visits to a given URL is performed on the visited URL field, a query hash is created for the URL which is then compared to the URL field data hash section segments. References to data records having matching hashes in any of the four bytes corresponding to the URL field as well as all records having a wildcard value for the four bytes of '0000' (hexadecimal) are recorded and returned. The original URL data for the records having live or more visits can then be searched for the requested URL to determine if a match exists.

The increased query response performance achieved by incorporating the present disclosure in a web analytics suite can result in more productive use of the analytics interface as well as increased user satisfaction with the service.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method, comprising:
receiving, by a data processing apparatus, a data record from a collection of data records, the data record having multiple dimensions, each dimension corresponding to a respective field in the data record and specifying a value;
receiving, by a data processing apparatus, a set of hashing options, the set of hashing options specifying hash lengths for hashes of the multiple dimensions of the data record, a hash length being specified for each dimension based on a number of different possible values of data in the dimension; and
creating, by a data processing apparatus, a composite fixed length data hash of the data record, the composite fixed length data hash being a concatenation of respective hashes of values specified by respective dimensions of the data record, each of the respective hashes being in a respective section of the composite fixed length data hash, each respective section having a section length that corresponds to the hash length of a particular dimension to which the respective section corresponds, the composite fixed length data hash having a fixed length at least equal to a sum of the section lengths of respective sections in the composite fixed length data hash, wherein one section of the composite fixed length data hash includes multiple segments that store respective hash values corresponding to multiple values in a field of the data record, each of the segments having a segment length that is shorter than the section length of the section in which the segments are included.

2. The method of claim 1 further comprising:

storing the composite fixed length data hash in computer readable memory with a reference to the data record.

3. The method of claim 2 further comprising:
receiving a query parameter value for a particular dimension of the collection of data records;
creating a query hash of the query parameter value using the hashing algorithm;
comparing the query hash to the section of the composite fixed length data hash that corresponds to the particular dimension, the section of the composite fixed length data hash that corresponds to the particular dimension being identified based on an index bit at which the section of the composite fixed length data hash begins; and
returning a reference to a data record having a composite fixed length data hash with a section corresponding to the indicated dimension that matches the query hash.

4. The method of claim 3 wherein comparing the query hash to the section of the composite fixed length data hash comprises:
comparing the query hash to the composite fixed length data hash starting at a beginning index number of the composite fixed length data hash and stopping at an ending index number of the composite fixed length data hash, the beginning index number of the composite fixed length data hash corresponding to an index bit of the composite fixed length data hash at which the section begins, the ending index number of the composite fixed length data hash corresponding to an index bit of the composite fixed length hash at which the section ends.

5. The method of claim 3 wherein comparing the query hash to the section of the composite fixed length data hash comprises:
comparing the query hash to the composite fixed length data hash starting at a beginning index bit of the section corresponding to the query hash and stopping after a number of bits compared matches a length of the section corresponding to the query hash.

6. The method of claim 2 further comprising:
receiving K query parameter values for K indicated dimensions of the collection of data records, K being an integer greater than 1;
creating K query hashes of the K query parameter values using the hashing algorithm;
comparing the K query hashes to K sections of the composite fixed length data hash that correspond to the K indicated dimensions; and
returning references to data records having composite fixed length data hashes with K sections corresponding to the K indicated dimensions that match the K query hashes.

7. The method of claim 1 further comprising:
receiving a query parameter value for querying a dimension corresponding to the section having multiple segments;
creating a query hash of the query parameter value using the hashing algorithm;
comparing the query hash to each of the segments of the section; and
returning a reference to a data record having a composite fixed length data hash with at least one section segment at matches the query hash.

8. The method of claim 1 wherein each of the multiple segments have equal lengths and a sum of the segment lengths is equal to the section length for the section in which the segments are included.

9. The method of claim 1 wherein one of the sections includes multiple segments that together store a wildcard hash value representing that a number of values in the field of the data record exceeds a maximum value, the maximum value being selected based on a number of segments in the section.

10. The method of claim 9 further comprising:
returning a reference to the corresponding data record if the multiple segments hold a wildcard value.

11. A method comprising:
counting, by a data processing device, a number of list values that appear in a field of a data record;
storing, by a data processing device, a wildcard hash value in a section of a composite fixed length data hash representing the data record in response to the number of list values exceeding a maximum value, the maximum value being determined based on a maximum number of values accurately represented by the section of the fixed length data hash, the composite fixed length data hash being a concatenation of hashes of values specified by fields of the data record, each section of the composite fixed length data hash containing a hash of a respective field of the data record; and
in response to receiving a query hash corresponding to the section of the composite fixed length data hash in which the wildcard hash is stored, searching the field of the data record corresponding to the section for a value in the list that matches a query parameter from which the query hash was created, wherein one section of the composite fixed length data hash includes multiple segments that store respective hash values corresponding to multiple values in a field of the data record, each of the segments having a segment length that is shorter than a section length of the section in which the segments are included.

12. The method of claim 11, wherein the list is a delimited list.

13. The method of claim 11 further comprising:
creating separate hashes of each of the list values and storing the created hashes into respective segments of the section in response to the number of list values not exceeding the maximum value.

14. A system comprising:
a user interface device; and
one or more computers configured to interact with the user interface device and to:
receive a query value from the user interface device, the query value corresponding to a field of a set of data records;
create a query hash of the query value;
compare the query hash to a section of a set of composite fixed length data hashes that each represent respective data records in the set of data records, each composite fixed length data hash being a concatenation of hashes of values specified by fields of the respective data records, each section corresponding to a particular field of the respective data records, containing a hash of the particular field of a data record, and having a section length that is selected based on a number of different possible values of data in the particular field, each of the composite fixed length data hashes having a same fixed length corresponding to an aggregate section length for sections of the fixed length data hash, the section to which the query hash is compared being the section corresponding to the particular field to which the query value corresponds; and
record references to data records that have a corresponding data hash section matching the query hash, wherein one section of the composite fixed length data hash includes multiple segments that store respective hash values corresponding to multiple values in a field of the data record, each of the segments having a segment length that is shorter than the section length of the section in which the segments are included.

15. The system of claim 14 wherein the one or more computers are further configured to:
retrieve a set of candidate data records using the recorded references; and
compare the query value to a field value of one of the candidate data records to determine if the candidate data record field matches the query value.

16. The system of claim 14 wherein the data records comprise Internet traffic data.

17. The system of claim 14 wherein the one or more computers are further configured to record references to data records having a data hash section that matches a wildcard hash value, the wildcard hash value being a value indicating more than a maximum number of field values are included in the particular field to which the query value corresponds, the maximum number of field values being selected based on a number of field value hashes that the data hash section accepts.

18. The system of claim 14 wherein the one or more computers are further configured to send data from the data records to the user interface.

19. The system of claim 14 wherein the one or more computers are further configured to:
record references to data records that have a corresponding data hash section that includes a wildcard hash value, the wildcard hash value being a value indicating more than a maximum number of field values are included in the particular field to which the query value corresponds, the maximum number of field values being selected based on a number of field value hashes that the data hash section accepts;
retrieve a set of candidate data records using the recorded references, the candidate data records being data records represented by the fixed length data hashes that include the wildcard hash value in the corresponding data hash section; and
compare the query value to multiple values of a field of one of the candidate data records to determine if the field of the candidate data record matches the query value.

* * * * *

UNITED STATES PATENT AND TRADEMARK OFFICE
CERTIFICATE OF CORRECTION

| | | |
|---|---|---|
| PATENT NO. | : 8,027,983 B1 | |
| APPLICATION NO. | : 11/733713 | |
| DATED | : September 27, 2011 | |
| INVENTOR(S) | : Sagnik Nandy, Jonathon A. Vance and Jan Matthias Ruhl | |

It is certified that error appears in the above-identified patent and that said Letters Patent is hereby corrected as shown below:

In Column 11, Line 61, delete "at" and insert --that--

Signed and Sealed this
Thirteenth Day of December, 2011

David J. Kappos
*Director of the United States Patent and Trademark Office*